H. SPRINGER.
Milking Pails.

No. 137,731. Patented April 8, 1873.

Attest:
O. W. Bond
E. T. Webster

Inventor
Henry Springer
West & Bond Att'ys.

UNITED STATES PATENT OFFICE.

HENRY SPRINGER, OF BRADY TOWNSHIP, MICHIGAN.

IMPROVEMENT IN MILKING-PAILS.

Specification forming part of Letters Patent No. 137,731, dated April 8, 1873; application filed August 7, 1872.

*To all whom it may concern:*

Be it known that I, HENRY SPRINGER, of the township of Brady, in the county of Kalamazoo and State of Michigan, have invented certain new and useful Improvements in Milking-Pails, of which the following is a full description, reference being had to the accompanying drawing making a part of this specification, in which—

Figure 1:
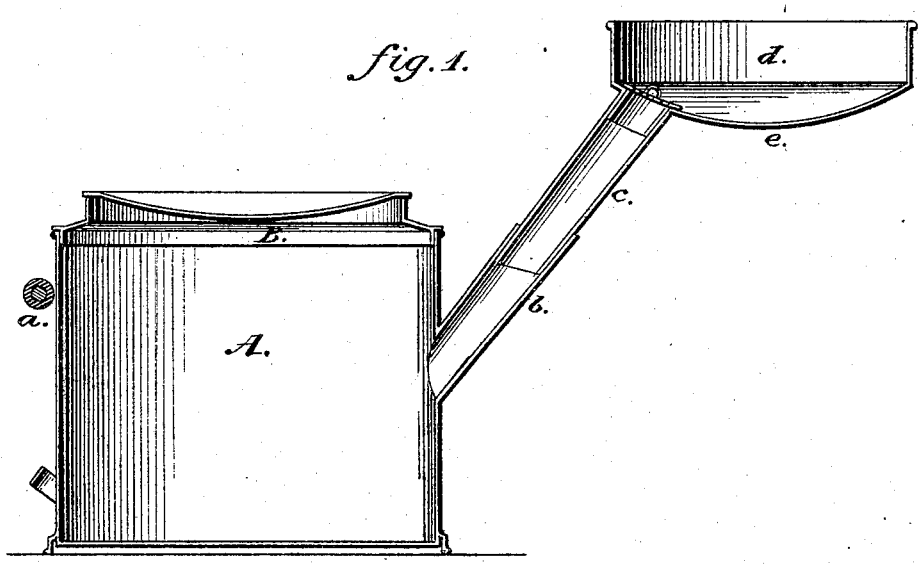
Figure 2:
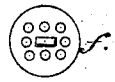

Figure 1 is a vertical section, and Fig. 2 a detail.

My invention consists in providing a milk-pail with a retaining receptacle, into which the operator can milk without spattering, said receptacle being connected with the pail by a spout.

In the drawing, A represents a pail, and B a cover for the same, constructed in any suitable manner, but strong enough for the purpose for which they are designed. *a* represents the handle and bail; *b*, a spout, permanently connected to the bail; *c*, another spout fitting into *b*. To the upper end of *c* is permanently secured a receptacle, *d*, the bottom of which, *e*, is concave. I attach the upper end of the tube *c* to the bottom of the receptacle *d*, as far as possible from the center thereof, so that when in use there will be a little milk, together with the froth usually made in milking, remaining in the receptacle *d* to prevent spattering. Over the opening from *d* into the spout *c* I place a coarse strainer, *f*, which may be made removable, or may be permanently fastened to *d*. The receptacle *d* can be raised or lowered at pleasure.

In use the operator sits upon B and milks into the receptacle *d*, from which the milk constantly flows into the pail A. The milk can be strained from the pail by removing the receptacle *d* and spout *c* and placing a strainer over the end of *b*, or by pouring milk into a strainer in the usual manner.

What I claim as new is as follows:

The receptacle *d*, when provided with a bottom, *e*, constructed to retain sufficient milk to prevent spattering, in combination with a spout, *c*, located at the side, substantially as specified.

HENRY SPRINGER.

Witnesses:
I. M. FLINT,
J. R. KING.